US010766629B2

(12) United States Patent
Mercier-Calvairac et al.

(10) Patent No.: US 10,766,629 B2
(45) Date of Patent: Sep. 8, 2020

(54) ARCHITECTURE OF A MULTIPLE-ENGINE HELICOPTER PROPULSION SYSTEM, AND CORRESPONDING HELICOPTER

(71) Applicants: SAFRAN HELICOPTER ENGINES, Bordes (FR); SAFRAN POWER UNITS, Toulouse (FR)

(72) Inventors: Fabien Mercier-Calvairac, Pau (FR); Stéphane Beddok, Pau (FR); Stéphane Chevalier, Colomiers (FR); Sophie Humbert, Pau (FR)

(73) Assignees: SAFRAN HELICOPTER ENGINES, Bordes (FR); SAFRAN POWER UNITS, Toulouse (FR)

( * ) Notice: Subject to any disclaimer, the term of this patent is extended or adjusted under 35 U.S.C. 154(b) by 197 days.

(21) Appl. No.: 15/127,747

(22) PCT Filed: Mar. 20, 2015

(86) PCT No.: PCT/FR2015/050693
§ 371 (c)(1),
(2) Date: Sep. 20, 2016

(87) PCT Pub. No.: WO2015/145037
PCT Pub. Date: Oct. 1, 2015

(65) Prior Publication Data
US 2017/0152055 A1 Jun. 1, 2017

(30) Foreign Application Priority Data

Mar. 27, 2014 (FR) ...................................... 14 52647

(51) Int. Cl.
*F02C 7/262* (2006.01)
*B64D 35/08* (2006.01)
(Continued)

(52) U.S. Cl.
CPC .............. *B64D 35/08* (2013.01); *B64C 27/14* (2013.01); *B64D 27/26* (2013.01); *F02C 3/04* (2013.01);
(Continued)

(58) Field of Classification Search
CPC ... B64D 35/08; B64D 2027/026; F02C 7/262; F02C 7/268; F02C 7/275; F02C 7/277; F02C 9/42; F05D 2260/85
See application file for complete search history.

(56) References Cited

U.S. PATENT DOCUMENTS

| 5,899,411 A | 5/1999 | Latos et al. |
| 2004/0129835 A1* | 7/2004 | Atkey .................... B64D 13/06 244/118.5 |

(Continued)

FOREIGN PATENT DOCUMENTS

| EP | 2 581 586 A2 | 4/2013 |
| FR | 2 967 133 A1 | 3/2011 |
| FR | 2 992 024 A1 | 6/2012 |

OTHER PUBLICATIONS

Written Opinion of the International Searching Authority dated Jul. 9, 2015 in corresponding International Application No. PCT/FR2015/050693, filed Mar. 20, 2015, 7 pages.

(Continued)

*Primary Examiner* — Steven M Sutherland
(74) *Attorney, Agent, or Firm* — Christensen O'Connor Johnson Kindness PLLC

(57) ABSTRACT

An architecture of a propulsion system of a multi-engine helicopter is disclosed, comprising turboshaft engines that are connected to a power transmission gearbox. It comprises: a hybrid turboshaft engine that is capable of operating in at least one standby mode during a stable flight of the helicopter; a pack for quickly restarting said hybrid turboshaft engine in order to bring said engine out of said (Continued)

standby mode and to reach a nominal operating mode; an auxiliary power unit that is connected to said electrotechnical restart pack by means of a first AC/DC converter and is capable of providing said restart pack, on demand, with power required for bringing said hybrid turboshaft engine out of said standby mode.

19 Claims, 1 Drawing Sheet

(51) Int. Cl.

| | | |
|---|---|---|
| *B64C 27/14* | (2006.01) | |
| *F02C 9/42* | (2006.01) | |
| *F02C 7/275* | (2006.01) | |
| *B64D 27/26* | (2006.01) | |
| *F02C 3/04* | (2006.01) | |
| *F02C 7/268* | (2006.01) | |
| *B64D 27/02* | (2006.01) | |

(52) U.S. Cl.
CPC .............. *F02C 7/262* (2013.01); *F02C 7/268* (2013.01); *F02C 7/275* (2013.01); *F02C 9/42* (2013.01); *B64D 2027/026* (2013.01); *F05D 2220/323* (2013.01); *F05D 2220/329* (2013.01); *F05D 2220/50* (2013.01); *F05D 2220/76* (2013.01); *F05D 2240/35* (2013.01); *F05D 2260/85* (2013.01); *Y02T 50/671* (2013.01)

(56) References Cited

U.S. PATENT DOCUMENTS

| | | | |
|---|---|---|---|
| 2008/0100135 A1* | 5/2008 | Lazarovich | H02J 5/00 307/9.1 |
| 2013/0031912 A1* | 2/2013 | Finney | F01D 15/10 60/778 |
| 2013/0219905 A1 | 8/2013 | Marconi et al. | |
| 2013/0229050 A1* | 9/2013 | Shipley | H02J 4/00 307/9.1 |
| 2015/0122944 A1 | 5/2015 | Dauriac et al. | |

OTHER PUBLICATIONS

International Preliminary Report on Patentability dated Sep. 27, 2016 in corresponding International Application No. PCT/FR2015/050693, filed Mar. 20, 2015, 1 page.

International Search Report dated Sep. 7, 2015 in corresponding International Application No. PCT/FR2015/050693, filed Mar. 20, 2015, 5 pages.

* cited by examiner

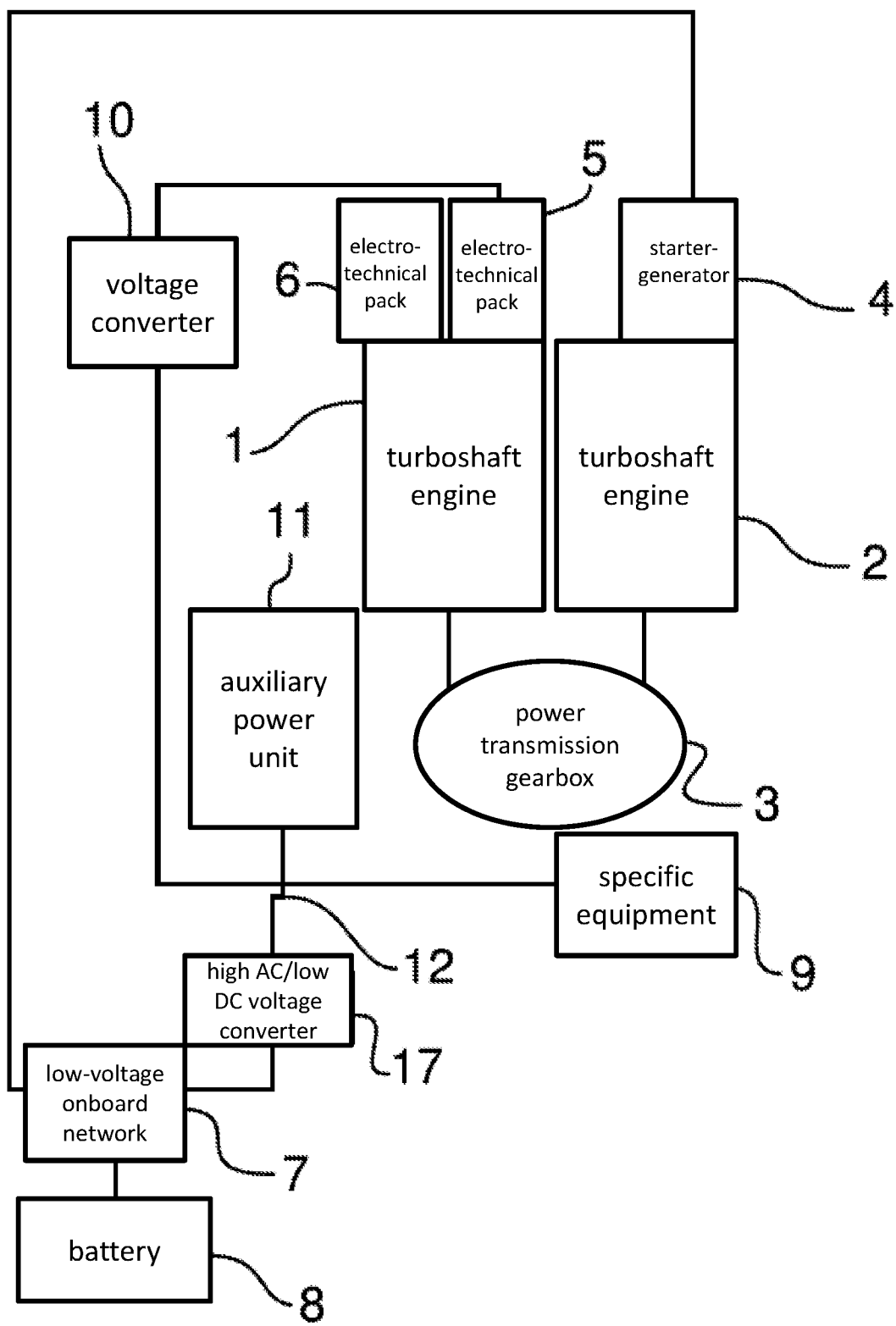

ARCHITECTURE OF A MULTIPLE-ENGINE HELICOPTER PROPULSION SYSTEM, AND CORRESPONDING HELICOPTER

TECHNICAL FIELD

Embodiments of the disclosure relate to an architecture of a propulsion system of a multi-engine helicopter, and in some embodiments a twin-engine or three-engine helicopter, and to a helicopter comprising a propulsion system having an architecture of this kind.

BACKGROUND

As is known, a twin-engine or three-engine helicopter has a propulsion system comprising two or three turboshaft engines, each turboshaft engine comprising a gas generator and a free turbine which is rotated by the gas generator and is rigidly connected to an output shaft. The output shaft of each free turbine is suitable for inducing the movement of a power transmission gearbox (referred to in the following by the abbreviation PTG), which itself drives the rotor of the helicopter which is equipped with blades having a variable pitch.

Furthermore, it is known that, when the helicopter is in a cruise flight situation (i.e. when it is progressing in normal conditions, in AEO (all engines operative) mode, during all the flight phases apart from transitional phases of take-off, landing or hovering flight), the turboshaft engines operate at low power levels, below their maximum continuous output (hereinafter MCO). In some arrangements, the power provided by the turboshaft engines during a cruise flight can be less than 50% of the maximum take-off output (hereinafter MTO). These low power levels result in a specific consumption (hereinafter SC), which is defined as the relationship between the hourly fuel consumption by the combustion chamber of the turboshaft engine and the thrust provided by the turboshaft engine, which is approximately 30% greater than the SC of the MTO, and thus a reduction in the efficiency of the gas turbines (or an increase in the SC).

In order to reduce this consumption during cruise flight (or during holding on the ground for example), it is possible to stop one of the turboshaft engines and to put it into a mode known as standby. The active engine or engines then operate at higher power levels in order to provide all the necessary power, and therefore at more favorable SC levels.

In the following, "economical flight phase" will denote a flight phase during which at least one turboshaft engine is in standby mode, and "conventional flight phase" will denote a flight phase during which none of the turboshaft engines are in standby mode.

In FR1151717 and FR1359766, the applicants proposed methods for optimising the specific consumption of the turboshaft engines of a helicopter by the possibility of putting at least one turboshaft engine into a stable flight mode, referred to as continuous flight mode, and at least one turboshaft engine into a particular standby mode that it can leave in emergencies or in a normal manner, according to need. A transition out of the standby mode is referred to as 'normal' when a change in the flight situation requires the turboshaft engine in standby to be activated, for example when the helicopter is going to transition from a cruise flight situation to a landing phase. A normal transition out of standby mode of this kind occurs over a period of between 10 seconds and 1 minute. A transition out of the standby mode is referred to as an 'emergency' when a there is a power failure or a power deficit in the active engine, or when the flight conditions suddenly become difficult. An emergency transition out of standby mode of this kind occurs over a period of less than 10 seconds.

A turboshaft engine leaves a standby mode and transitions from an economical flight phase to a conventional flight phase for example by means of a pack for restarting the turboshaft engine, which pack is associated with a device for storing energy, such as an electrochemical store like a lithium ion battery, an electrostatic store like a supercapacitor, or an electromechanical store like a flywheel, which allows both the turboshaft engine to be provided with the energy required for restarting and a nominal operation mode to be reached.

Such a pack for restarting the turboshaft engine in standby has the disadvantage of substantially increasing the total weight of the turboshaft engine. The benefit in terms of fuel consumption obtained by placing the turboshaft engine in standby is thus partly lost by the excess weight brought about by the restart device, the device for storing energy required for the restart, in particular when each turboshaft engine is equipped with an emergency restart device of this type.

SUMMARY

The inventors have thus sought to solve problems which are incompatible a priori, namely the possibility of placing the helicopter in the economical flight phase, i.e. of placing at least one turboshaft engine in standby, without increasing the weight of the overall propulsion system too much.

In other words, the inventors have sought to propose a new architecture of the propulsion system of, e.g., a twin-engine or three-engine helicopter.

Embodiments of the disclosure aim to provide a new architecture of the propulsion system of a multi-engine helicopter.

Embodiments of the disclosure also aim to provide an architecture of a propulsion system of a multi-engine helicopter which allows a turboshaft engine to be placed in standby and allows the quick restart thereof.

Embodiments of the disclosure also aim to provide, in at least one embodiment of the disclosure, an architecture of a propulsion system which has a mass and a volume which are acceptable for being installed in a helicopter.

Embodiments of the disclosure also aim to provide, in at least one embodiment of the disclosure, an architecture of a propulsion system which has a lower cost than the architectures from the prior art that have the same performance.

In order to achieve one or more of these goals or others, the disclosure relates to an architecture of a propulsion system of a multi-engine helicopter, comprising turboshaft engines that are connected to a power transmission gearbox, characterised in that it comprises:

at least one turboshaft engine among the turboshaft engines, referred to as a hybrid turboshaft engine, which is configured to operate in at least one standby mode during a stable flight of the helicopter, the other turboshaft engines operating alone during this stable flight, at least one pack for quickly restarting a hybrid turboshaft engine in order to bring the engine out of the standby mode and to reach a nominal operating mode, at least one auxiliary power unit that is connected to a restart pack and is configured to provide this restart pack, on demand, with power required for bringing the corresponding hybrid turboshaft engine out of the standby mode.

Therefore, the architecture of the propulsion system of a multi-engine helicopter according to the disclosure has at least one hybrid turboshaft engine, the other turboshaft engines being non-hybrid and each hybrid turboshaft engine being configured to operate in a standby mode. The architecture of the disclosure is therefore asymmetrical because it has at least one hybrid turboshaft engine and at least one non-hybrid turboshaft engine.

A hybrid turboshaft engine is a turboshaft engine that is configured so as to be able to be placed, on demand and voluntarily, in at least one predetermined standby mode that it can leave in a rapid (also referred to as emergency) or normal manner. A turboshaft engine can only be in standby mode during a stable flight of the helicopter, i.e. when no turboshaft engine of the helicopter has failed, during a cruise flight situation when it is progressing in normal conditions. Leaving the standby mode includes in changing the turboshaft engine into a mode for accelerating the gas generator by means of driving in a manner that is compatible with the leaving mode required by the conditions (normal standby-leaving mode or rapid (also referred to as emergency) standby-leaving mode).

Furthermore, the architecture provides at least one restart pack supplied with current by an auxiliary power unit, thus making it possible to overcome the drawbacks of the prior art linked to the use of a battery-like or supercapacitor-like energy storage source.

An auxiliary power unit (referred to in the following by the abbreviation APU) of this type ensures that a restart pack of a hybrid turboshaft engine has a permanent electricity supply, regardless of the atmospheric conditions (in some embodiments regardless of the temperature), the supply also being constant over time (no aging effect).

This APU can, for example, comprise a thermal engine (such as a connected gas power turbine or a two-stroke or four-stroke petrol or diesel engine) and a starter-generator configured to restart the combustion of the unit and of supplying the required electrical power to the electrotechnical pack.

An architecture according to the disclosure is particularly suitable for helicopters that already have an auxiliary power unit intended, for example, for supplying non-propulsive, electrical, mechanical, hydraulic and/or pneumatic power during all the flight phases in which the turboshaft engines are not able to do so: on the ground, in the transition phases (take off, landing), in the approach phases, etc. The use of this APU together with a restart pack according to the disclosure thus makes it possible to dispense with an energy storage system for assisting a turboshaft engine in standby.

A restart pack according to the disclosure is, for example, an electrotechnical, pyrotechnic, pneumatic or hydraulic pack. Throughout the rest of the text, reference will be made in some embodiments to an electrotechnical restart pack, with the understanding that the disclosure also covers an architecture provided with a pyrotechnic, pneumatic or hydraulic restart pack.

Advantageously, an auxiliary power unit has an economical standby function, with the chamber ignited and at low speed, and a function of quickly leaving this standby mode in order to quickly provide its maximum power to the electrotechnical pack to restart the hybrid turboshaft engine. The electrical power is made available within a time period that is compatible with the flight safety requirements, in some embodiments in the event of a turboshaft engine in standby being restarted in an emergency, or in the event of a non-hybrid turboshaft engine being lost.

Advantageously, an architecture according to a representative embodiment of the disclosure comprises:

just one hybrid turboshaft engine configured to operate in at least one standby mode during a stable flight of the helicopter, the other turboshaft engines operating alone during this stable flight, just one pack for quickly restarting the turboshaft engine to bring the engine out of the standby mode and to reach a nominal operating mode, just one auxiliary power unit that is connected to the restart pack and configured to provide the restart pack, on demand, with power required for bringing the hybrid turboshaft engine out of the standby mode.

An architecture that has just one hybrid turboshaft engine, just one restart pack and just one auxiliary power unit connected to the restart pack means that the number of components can be reduced. Furthermore, this limits the total weight of the propulsion system. An architecture of this kind thus combines the advantages of an SC optimisation, owing to the possibility of placing a turboshaft engine in standby, with reduced size and weight.

Advantageously and according to an embodiment of this variant, the architecture comprises: a low DC voltage onboard network (referred to in the following by the abbreviation OBN) for supplying power to helicopter equipment, at least one source of electric power for the onboard network, and the auxiliary power unit is connected to the onboard network by an AC/DC converter.

The auxiliary power unit is connected to the electrotechnical pack by an AC/DC converter. A converter of this type enables the use of both an auxiliary power unit that supplies an AC voltage, and a DC electrotechnical pack. According to another variant, the auxiliary power unit directly generates a direct current.

The power unit not only makes it possible to provide the energy required for restarting the hybrid turboshaft engine, but also to supply power to the onboard network. The architecture therefore has redundancy in the electrical power generation (by an electrical power source and the auxiliary power unit) for supplying power to the OBN, meaning that a possible failure of the first power source for the OBN is compensated for by the second power source.

According to an embodiment of this variant and advantageously, the architecture comprises a contact switch that is arranged between the auxiliary unit and the onboard network and controlled such as to decouple the auxiliary power unit from the onboard network when the hybrid turboshaft engine is restarted in an emergency.

According to an embodiment of this variant, the auxiliary power unit can supply all of its power to the hybrid turboshaft engine in order to restart it. Indeed, the contact switch makes it possible to decouple the auxiliary unit from the onboard network such that all the power from the auxiliary unit is intended for the turboshaft engine. The OBN supply is maintained by the power source, which thus compensates for the auxiliary unit being unavailable.

The contact switch can be arranged upstream or downstream of the AC/DC converter.

Advantageously and according to an embodiment of this variant, the source of electrical power for the onboard network is selected from the group comprising:

at least one current generator that is arranged between the power gearbox and the onboard network and is associated with an AC/DC converter a starter-generator that is arranged between a non-hybrid turboshaft engine and the onboard network.

According to another embodiment of variant, the auxiliary power unit can be placed into standby during the cruise flight phases and so can no longer carry out the generation function. In this case, the architecture has to comprise two electrical power sources for the OBN. For example, a first electrical power source is a generator that is arranged between the PTG and the OBN and associated with an AC-DC converter, and a second electrical power source is a starter-generator that is arranged between a non-hybrid turboshaft engine and the OBN.

Advantageously and according to an embodiment of this variant, the generator is configured to provide an AC voltage of 115 volts and the associated converter is configured to provide a DC voltage of 28 volts.

Advantageously and according to an embodiment of the disclosure, the quick restart pack comprises: an electrical machine configured to restart the hybrid turboshaft engine when leaving standby in normal conditions, and a device for leaving standby in an emergency that is configured to restart the hybrid turboshaft engine when leaving standby in emergency conditions.

A turboshaft engine comprises, as is known, a gas generator and a free turbine that is supplied with the gases from the gas generator. The gas generator comprises a shaft and a combustion chamber that is supplied with fuel.

A mode for leaving standby in an emergency is a mode in which the combustion chamber is ignited and the shaft of the gas generator is brought to a speed of between 80 and 105% within a period of less than 10 seconds following an order to leave standby.

A mode for leaving standby normally is a mode in which the combustion chamber is ignited and the shaft of the gas generator is brought to a speed of between 80 and 105% within a period of between 10 seconds and 1 minute following an order to leave standby mode.

The electrical machine can be an electrical machine operating using alternating or direct current.

Advantageously and according to an embodiment of the disclosure, the device for leaving standby in an emergency is an electrotechnical, pyrotechnic, pneumatic or hydraulic device.

Advantageously and according to an embodiment of the disclosure, the auxiliary power unit is connected to the restart pack by means of an AC/DC converter.

Embodiments of the disclosure also relate to a helicopter comprising a propulsion system, wherein the propulsion system has an architecture according to the disclosure.

Embodiments of the disclosure also relate to an architecture of a propulsion system of a multi-engine helicopter, and to a helicopter equipped with a propulsion system having an architecture of this kind, characterized in combination by all or some of the features mentioned above or in the following.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein the FIGURE is a schematic view of an architecture of a propulsion system of a twin-engine helicopter according to an embodiment of the disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The FIGURE is a schematic view of an architecture of a propulsion system of a twin-engine helicopter according to an embodiment of the disclosure. This architecture comprises two turboshaft engines 1, 2 that are connected to a power transmission gearbox 3. Each turboshaft engine 1, 2 is controlled by its own inspection-control device, which is not shown in the FIGURE for reasons of clarity.

Each turboshaft engine further comprises a gas generator and a free turbine that is rigidly connected to an output shaft rotated by the gas generator. The output shaft of each free turbine is suitable for inducing the movement of the power transmission gearbox 3 (referred to in the following by the abbreviation PTG), which itself drives the rotor of the helicopter which is equipped with blades having a variable pitch.

According to the disclosure, the turboshaft engine 1 is a hybrid turboshaft engine that is configured to operate in at least one standby mode during a stable flight of the helicopter.

This standby mode is preferably selected from the following operating modes:

a standby mode referred to as normal idling, in which the combustion chamber is ignited and the shaft of the gas generator rotates at a speed of between 60 and 80% of the nominal speed, a standby mode referred to as normal super-idling mode, in which the combustion chamber is ignited and the shaft of the gas generator rotates at a speed of between 20 and 60% of the nominal speed, a standby mode referred to as assisted super idling, in which the combustion chamber is ignited and the shaft of the gas generator rotates, with mechanical assistance, at a speed of between 20 and 60% of the nominal speed, a standby mode referred to as turning, in which the combustion chamber is extinguished and the shaft of the gas generator rotates, with mechanical assistance, at a speed of between 5 and 20% of the nominal speed, a standby mode referred to as shutdown, in which the combustion chamber is extinguished and the shaft of the gas generator is at a complete stop.

The architecture further comprises an electrotechnical pack 5, 6 for quickly restarting the hybrid turboshaft engine 1 in order to bring it out of the standby mode and to reach a nominal operating mode.

This restart pack 5, 6 is supplied with electricity by an auxiliary power unit 11 (referred to in the following by the abbreviation APU) by means of an AC/DC converter 10. This auxiliary engine provides non-propulsive power to the electrotechnical pack 5, 6 on demand to allow the pack to bring the hybrid turboshaft engine 1 out of its standby mode.

This APU 11 can, for example, comprise a thermal engine (such as a connected gas power turbine or a two-stroke or four-stroke petrol or diesel engine) and a starter-generator configured to restart the combustion of the APU and of providing the necessary electrical power to the electrotechnical pack. Preferably, the APU provides an AC voltage of 115 volts.

The AC/DC converter 10 enables the high AC voltage of 115 volts supplied by the APU 11 to be converted into high DC voltage required for restarting the turboshaft engine 1.

According to other embodiments, the APU directly provides a DC voltage, and so there is no need for a voltage converter 10.

The architecture further comprises a low-voltage onboard network 7, preferably of 28 volts (referred to in the following by the abbreviation OBN), for supplying power to helicopter equipment during flight.

This OBN 7 is supplied with current by the APU 11 by a high AC/low DC voltage converter 17, and by a starter-generator 4 that is connected to the turboshaft engine 2 and directly provides low DC voltage. The OBN 7 further supplies power to a battery 8 for storing 28 volt energy. According to another variant (not shown in the FIGURE), the OBN 7 is supplied with power by a generator installed on the PTG 3.

To prevent the restart of the turboshaft engine 1 being disrupted, a contact switch 12 is arranged between the OBN 7 and the APU 11 to decouple the OBN 7 and the APU 11 when all the electrical power in the APU 11 is required to bring the turboshaft engine 1 out of the standby mode.

Preferably, the APU provides an AC voltage of 115 volts and the OBN 7 is a 28 DC volt network. This APU 11 can also directly supply power to specific equipment 9 of the helicopter.

According to the embodiment shown in the FIGURE, the quick restart pack comprises an electrical machine 5 that is configured to restart the hybrid turboshaft engine 1 when leaving standby in normal conditions, and a device 6 for leaving standby in an emergency that is configured to restart the turboshaft engine 1 when leaving standby in emergency conditions.

This device 6 for leaving standby in an emergency is, for example, an electrical, pyrotechnic, pneumatic or hydraulic device.

According to another embodiment of the disclosure (not shown in the FIGURE), the APU is designed to provide a DC voltage and the electrical machine is designed to operate using alternating current. In this case, an inverter is arranged between the APU and the electrical machine to rectify the current and to power the electrical machine by means of the energy produced by the APU.

The disclosure is not limited to the described embodiments only. In some embodiments, the architecture can comprise three turboshaft engines for the equipment of a three-engine helicopter.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An architecture of a propulsion system of a multi-engine helicopter, comprising:
a plurality of turboshaft engines that are connected to a power transmission gearbox comprising a hybrid turboshaft engine configured to operate in a nominal operating mode, in which a shaft of a gas generator of the hybrid turboshaft engine rotates at a nominal speed and a combustion chamber of the said gas generator is ignited, and a standby mode during flight of the multi-engine helicopter, in which the shaft of said gas generator of the hybrid turboshaft engine rotates at a speed less than that of said nominal speed, and
at least one non-hybrid turboshaft engine that is not coupled to any restart packs,
wherein during an economical flight phase, the at least one non-hybrid turboshaft engine operates in a stable flight mode and the hybrid turboshaft engine operates in said standby mode;
a restart pack configured for restarting the hybrid turboshaft engine during said flight in order to cause the hybrid turboshaft engine to leave said standby mode and to reach the nominal operating mode in less than ten seconds from an indication of an emergency condition;
an auxiliary power unit that is connected to the restart pack and is configured for providing said restart pack, on demand, with power required for causing the hybrid turboshaft engine to leave said standby mode and to reach the nominal operating mode, said auxiliary power unit arranged to provide power to equipment of the multi-engine helicopter.

2. The architecture according to claim 1, wherein said restart pack comprises (a) an electrical machine that is configured to restart the hybrid turboshaft engine when leaving standby mode in normal conditions, and (b) a device for leaving standby mode in an emergency condition that is configured to restart the hybrid turboshaft engine when leaving standby mode in said emergency condition, wherein said device for leaving standby mode in an emergency condition is selected from a group of devices consisting of an electrotechnical, pyrotechnic, pneumatic and a hydraulic device.

3. The architecture according to claim 1, wherein said auxiliary power unit is connected to said restart pack by an AC/DC converter.

4. A helicopter comprising a propulsion system, wherein said propulsion system has an architecture according to claim 1.

5. The architecture according to claim 1, wherein during said standby mode the shaft of the gas generator of the hybrid turboshaft engine rotates at a speed of between 60% and 80% of the nominal speed and the combustion chamber of the gas generator of the hybrid turboshaft engine is ignited.

6. The architecture according to claim 1, wherein during said standby mode the shaft of the gas generator of the turboshaft engine rotates at a speed of between 20% and 60% of the nominal speed and the combustion chamber of the gas generator of the hybrid turboshaft engine is ignited.

7. The architecture according to claim 1, wherein during said standby mode the shaft of the gas generator of the hybrid turboshaft engine rotates at a speed of between 20% and 60% of the nominal speed with mechanical assistance and the combustion chamber of the gas generator of the hybrid turboshaft engine is ignited.

8. The architecture according to claim 1, wherein during said standby mode the shaft of the gas generator of the hybrid turboshaft engine rotates at a speed of between 5% and 20% of the nominal speed and the combustion chamber of the gas generator of the hybrid turboshaft engine is not ignited.

9. The architecture according to claim 1, wherein during said standby mode the shaft of the gas generator of the hybrid turboshaft engine does not rotate and the combustion chamber of the gas generator of the hybrid turboshaft engine is not ignited.

10. The architecture according to claim 1, wherein said restart pack comprises a restart device configured to restart the hybrid turboshaft engine when leaving standby mode in said emergency condition, said restart device selected from a group consisting of a pyrotechnic device and a hydraulic device.

11. An architecture of a propulsion system of a multi-engine helicopter, comprising:
just one hybrid turboshaft engine configured to operate in a nominal operating mode, in which a shaft of a gas generator of the just one hybrid turboshaft engine rotates at a nominal speed and a combustion chamber of the said gas generator is ignited, and a standby mode during flight of the multi-engine helicopter, in which the shaft of said gas generator of the just one hybrid turboshaft engine rotates at a speed less than that of said nominal speed;
at least one non-hybrid turboshaft engine that is not coupled to any restart packs, wherein during an economical flight phase, the at least one non-hybrid turboshaft engine operates in a stable flight mode and the hybrid turboshaft engine operates in said standby mode;
just one restart pack configured for restarting the just one hybrid turboshaft engine in order to bring said just one hybrid turboshaft engine out of said standby mode and to reach said nominal operating mode and;
just one auxiliary power unit that is connected to said just one restart pack and is capable of providing said just one restart pack, on demand, with power necessary for bringing said just one hybrid turboshaft engine out of said standby mode and to reach said nominal operating mode.

12. The architecture according to claim 11, further comprising:
a low DC voltage onboard network configured for supplying power to helicopter equipment during flight,
at least one source of electrical power for said low DC voltage onboard network,
wherein the just one auxiliary power unit is connected to said low DC voltage onboard network by an AC/DC converter.

13. The architecture according to claim 12, wherein the architecture comprises a contact switch that is arranged between the just one auxiliary power unit and the low DC voltage onboard network and is controlled such as to decouple said just one auxiliary power unit from said low DC voltage onboard network when the just one hybrid turboshaft engine is restarted in an emergency.

14. The architecture according to claim 12, wherein the at least one source of electrical power for the low DC voltage onboard network is selected from a group consisting of:
at least one current generator that is arranged between a power transmission gearbox and the low DC voltage onboard network and is associated with an AC-DC converter, and
a starter-generator that is arranged between a non-hybrid turboshaft engine and said low DC voltage onboard network.

15. The architecture according to claim 14, wherein the at least one current generator is capable of providing an AC voltage of 115 volts and wherein the associated AC-DC converter is capable of providing a DC voltage of 28 volts.

16. The architecture according to claim 11, wherein the at least one non-hybrid turboshaft engine includes first and second non-hybrid engines.

17. The architecture according to claim 11, wherein during said standby mode:
the shaft of the gas generator of the just one hybrid turboshaft engine rotates at a speed of between 60% and 80% of the nominal speed and the combustion chamber of the gas generator of the just one hybrid turboshaft engine is ignited;
the shaft of the gas generator of the just one hybrid turboshaft engine rotates at a speed of between 20% and 60% of the nominal speed and the combustion chamber of the gas generator of the just one hybrid turboshaft engine is ignited;
the shaft of the gas generator of the just one hybrid turboshaft engine rotates at a speed of between 20% and 60% of the nominal speed with mechanical assistance and the combustion chamber of the gas generator of the just one hybrid turboshaft engine is ignited;
the shaft of the gas generator of the just one hybrid turboshaft engine rotates at a speed of between 5% and 20% of the nominal speed and the combustion chamber of the gas generator of the just one hybrid turboshaft engine is not ignited; or
the shaft of the gas generator of the just one hybrid turboshaft engine does not rotate and the combustion chamber of the gas generator of the just one hybrid turboshaft engine is not ignited.

18. A helicopter comprising a propulsion system, wherein said propulsion system has an architecture according to claim 11.

19. An architecture of a propulsion system of a multi-engine helicopter, comprising:
a hybrid turboshaft engine configured to operate in a nominal operating mode, in which a shaft of a gas generator of the hybrid turboshaft engine rotates at a nominal speed and a combustion chamber of the said gas generator is ignited, and configured to operate in a standby mode during flight of the multi-engine helicopter, in which the shaft of said gas generator of the hybrid turboshaft engine rotates at a speed less than that of said nominal speed and the hybrid turboshaft engine is ignited, wherein during standby mode said shaft of the gas generator of the hybrid turboshaft engine rotates at a speed selected from a group consisting of between 60% and 80% of the nominal speed, between 20% and 60% of the nominal speed, and between 20% and 60% of the nominal speed with mechanical assistance;
at least one non-hybrid turboshaft engine that is not coupled to any restart packs, wherein during an economical flight phase, the at least one non-hybrid turboshaft engine operates in a stable flight mode and the hybrid turboshaft engine operates in said standby mode;
a restart pack configured for restarting the hybrid turboshaft engine during said flight in order to cause the hybrid turboshaft engine to leave said standby mode and to reach the nominal operating mode in less than ten seconds from receipt of a control signal indicative of an emergency condition;
an auxiliary power unit connected to the restart pack and configured for providing said restart pack, on demand, with power required for causing the hybrid turboshaft engine to leave said standby mode and to reach the nominal operating mode, said auxiliary power unit arranged to provide power to non-propulsive equipment of the multi-engine helicopter.

\* \* \* \* \*